(12) United States Patent
Heinrici et al.

(10) Patent No.: US 11,112,615 B2
(45) Date of Patent: Sep. 7, 2021

(54) DEVICE AND METHOD FOR THE GENERATION OF A DOUBLE OR MULTIPLE SPOT IN LASER MATERIAL PROCESSING

(71) Applicant: II-VI Delaware Inc., Wilmington, DE (US)

(72) Inventors: Axel Heinrici, Kleinmachnow (DE); Goran Bjelajac, Kleinmachnow (DE)

(73) Assignee: II-VI DELAWARE INC., Wilmington, DE (US)

(*) Notice: Subject to any disclaimer, the term of this patent is extended or adjusted under 35 U.S.C. 154(b) by 0 days.

(21) Appl. No.: 16/840,106

(22) Filed: Apr. 3, 2020

(65) Prior Publication Data
US 2020/0319473 A1    Oct. 8, 2020

(51) Int. Cl.
G02B 27/14    (2006.01)
G02B 27/09    (2006.01)

(52) U.S. Cl.
CPC ..... *G02B 27/0938* (2013.01); *G02B 27/0916* (2013.01)

(58) Field of Classification Search
CPC ............ G02B 27/0938; G02B 26/0816; G02B 27/0977; G02B 27/0927
See application file for complete search history.

(56) References Cited

U.S. PATENT DOCUMENTS 8,425,496 B2 * 4/2013 Vogler ................ A61F 9/00827
606/4
8,891,170 B2 * 11/2014 Tanaka .............. H01L 21/02675
359/623

FOREIGN PATENT DOCUMENTS

| CN | 205764433 U | 12/2016 |
| DE | 4024299 A1 | 2/1992 |
| DE | 19961918 A1 | 7/2019 |
| WO | 9851442 A1 | 11/1998 |

* cited by examiner

Primary Examiner — Joseph P Martinez
(74) Attorney, Agent, or Firm — Blank Rome LLP

(57) ABSTRACT

The invention relates to a device and a method for generating a multiple spot during laser material processing. According to the present invention, the power distribution is selected by pushing at least a first mirror into the laser beam. The light beam always falls on only one side of the mirror, so that the mirror can be produced easily and economically.

15 Claims, 10 Drawing Sheets

DEVICE AND METHOD FOR THE GENERATION OF A DOUBLE OR MULTIPLE SPOT IN LASER MATERIAL PROCESSING

CROSS-REFERENCE TO RELATED APPLICATIONS

The present application claims priority to German Patent Application No. DE 10 2019 108 681.7 filed on Apr. 3, 2019. The aforementioned application is hereby incorporated by reference in its entirety.

BACKGROUND OF THE INVENTION

Field of the Invention

The invention relates to a device and a method for generating a multiple spot in laser material processing.

Brief Description of the Related Art

In laser material processing of metals or other materials, it is often desirable to be able to use a double spot or even multiple spots. To generate such spots different solutions are known from the state of the art.

Published German Patent Application No. DE 199 61 918 A1 describes a method and a device for laser material processing with at least two laser beam foci, which are imaged onto the workpiece to be processed, wherein a double focus is generated from a single focus of a laser beam by using refractive elements in a variable focus geometry, wherein distance and intensity between the foci can be freely selected. The technical solution of this document is based on refractive elements, wherein in practice the usable power is limited to about 10 kW.

Published German Patent Application No. DE 402 42 99A1 teaches a device for focusing a light beam in at least two focal points with a mirror element which splits the light beam into a number of partial beams corresponding to the number of focal points, wherein the mirror element has a number of mirror surfaces corresponding at least to the number of focal points and wherein the mirror element is movable relative to the incident light beam to vary the beam intensity in the individual focal points and the distance between the individual focal points. The system therefore has at least two mirrors for a double focus. The first concave mirror focuses a collimated laser beam. Between this mirror and the focus there is a second mirror with two different mirror surfaces that have an angle unequal to 0°. By varying the position of the second mirror along or perpendicular to the optical axis, the intensity and position of the two spots can be adjusted. A major disadvantage of this invention is that the distance between the second mirror and the workpiece depends on the desired distance between the two spots. During the laser material processing, droplets, metal vapors etc. are produced which limit the service life of the optics. A protective glass is normally used for this purpose, which must be resistant enough to withstand a process operation. For an acceptable lifetime a geometrical distance to the process, i.e. to the focus, is required. Further disadvantages of the teaching of this document are the lack of adjustment possibilities to be able to adjust the intensities and positions of more than two spots independently of each other and the complexity of the second mirror, especially with regard to the coating to the line where the two optical surfaces meet. The surface there has an extremely small radius of curvature which, in combination with the mechanical stresses inherent in the coating, has a strongly negative effect on the yield during production.

A complex mirror is avoided with the system from the published International Application No. WO 98/51442 A1. A first mirror deflects the laser beam, but according to this document, the beam hits two different mirrors subsequently. The power distribution is adjusted here by means of the vertical position of the first mirror. The position of the two spots can be changed by moving the other two mirrors horizontally. However, even with this system it is still difficult to adjust the power in more than two spots independently. A bigger problem is that there is a gap between the other two mirrors. This is disadvantageous for the application of the described system for high laser power, because the gap will always be within the laser beam.

The problem of a gap is reduced by the teaching of the published Chinese Utility Model Np. CN 205764433 U by arranging mirrors directly next to each other. A distance between two or three different spots is adjusted by tilting the corresponding mirrors. In principle, this design is limited to a maximum of three spots and the power would only be adjustable independently of each other with two spots.

SUMMARY OF THE INVENTION

The technical problem to be solved by the present invention is therefore to enable the generation of a double or multiple spot with a laser material processing optic for a power of at least 10 kW. Both, the position and the power in the different spots should be adjustable.

The present invention provides a device for variable beam shaping of a light beam, comprising:
  a. an entry aperture with an entry cross-section and with an entry axis which passes centrally through the entry aperture, a continuation of the entry cross-section along the entry axis defining a free propagation volume;
  b. a collimation optics arranged between entrance aperture and an arrangement of mirrors;
  c. the arrangement of mirrors comprising at least
    i. a first mirror, the first mirror having a reflecting surface only on a side facing the laser beam and being arranged at least partially in a collimated laser beam for re-reflection of a partial beam;
    ii. a second mirror with a reflecting surface in the direction of the reflecting surface of the first mirror to deflect the reflected partial beam of the collimated laser beam;
    iii. a third mirror comprising a reflecting surface in the direction of the second mirror to reflect the reflected partial beam of the collimated laser beam back next to the unreflected partial beam of the collimated laser beam;
  d. a displacement device connected to at least one mirror of the array of mirrors to move it into the undivided collimated laser beam;
  e. an angle adjusting device connected to at least one mirror of the array of mirrors for its rotation; and
  f. focusing optics arranged behind the third mirror for focusing the reflected partial beam of the laser beam and the unreflected partial beam of the collimated laser beam with at least one double focus.

In a further aspect of the invention, the displacement device may be connected to the first mirror.

Furthermore, an embodiment is provided in which the angle adjusting device can be connected to the second mirror.

Furthermore, in the arrangement of mirrors, a further mirror can be placed between the first and second mirror and the mirrors can now be named as follows
  i. a first mirror, the first mirror having a reflecting surface only on a side facing the collimated laser beam;
  ii. a second mirror with a reflecting surface in the direction of the first mirror to deflect the reflected partial beam of the collimated laser beam;
  iii. a fourth mirror comprising a reflecting surface towards the second mirror for redirecting the reflected partial beam of the collimated laser beam;
  iv. a third mirror comprising a reflecting surface in the direction of the fourth mirror to reflect the reflected partial beam of the laser beam from the fourth mirror as well as the unreflected partial beam of the collimated laser beam;
wherein the reflecting surfaces of the first and second mirrors are arranged parallel to each other, the second or fourth mirror is connected to the angle adjusting device for its rotation, and the first and third mirrors are connected to the displacement device and are movable therewith in the direction of reflection of the partial beam of the collimated laser beam.

It may also be provided that a first and a third mirror are connected to the displacement device so that they are movable transversely to the direction of deflection of the collimated partial beam of the laser beam.

If the device is further designed, the arrangement may comprise two further mirrors with which a second partial beam of the collimated laser beam is reflected, the two further mirrors being named as follows,
  a. a fifth mirror arranged adjacent to the first mirror for reflecting a second partial beam of the collimated laser beam onto the second mirror, and
  b. a sixth mirror arranged adjacent to the third mirror for reflecting the second reflected partial beam of the collimated laser beam again adjacent to the unreflected partial beam of the collimated laser beam, the fifth and sixth mirrors being movable transversely to the deflection direction of the collimated partial beam of the laser beam by means of a connection with a second shifting device.

In the aforementioned embodiment, the second or fourth mirror may be divided and the at least two parts may be independently adjustable.

In a further embodiment of the device according to the invention, the first and third mirrors can be arranged one behind the other, partially overlapping, in such a way that they each partially reflect the collimated laser beam onto the second mirror, the first mirror can be moved into or out of the collimated laser beam at an angle to the beam direction of the collimated laser beam by means of the displacement device, and the third mirror is connected to the angle adjustment device in order to be able to rotate it.

It is further provided that the arrangement of mirrors comprises four mirrors, wherein the first mirror is arranged to reflect a partial beam of the collimated laser beam to the second mirror, the third mirror is arranged partially overlapping behind the first mirror to redirect a partial beam of the collimated laser beam to the fourth mirror, and the second and fourth mirrors are arranged partially overlapping one behind the other, in that they each deflect the reflected partial beam of the collimated laser beam onto the focusing optics, the first and fourth mirrors being connected to a displacement device in order to move the latter into or out of the collimated laser beam at an angle to the beam direction of the collimated laser beam, and the second or third mirror being connected to an angle adjustment device in order to be able to rotate the latter.

Furthermore, in one version, the first and fourth mirrors can be arranged displaceable at right angles to the direction of deflection of the partial beam of the laser beam.

The present invention further relates to a method for generating a multiple spot in laser material processing, comprising the steps
  a. Collimation of a divergent laser beam by means of collimation optics;
  b. Displacement of at least a first mirror in a part of the collimated laser beam by a displacement device;
  c. Reflecting a partial beam of the collimated laser beam through the first mirror by means of a reflecting surface onto the reflecting surface of a second mirror;
  d. Reflecting the partial beam of the collimated laser beam through the second mirror by means of a reflecting surface onto the reflecting surface of a third mirror;
  e. Reflection of the partial beam of the collimated laser beam by the third mirror next to the unreflected partial beam of the collimated laser beam;
  f. Creating a difference angle between the reflected and the unreflected partial beam by rotating at least one of the mirrors;
  g. Focusing of reflected and unreflected partial beam of the collimated laser beam by means of focusing optics;
  h. Imaging a beam focus with at least a double focus on a workpiece to be processed.

The method can also be designed in such a way that four mirrors are used to create a double focus.

Furthermore, the method may include the step of using a fifth and sixth mirror to generate an additional focus.

In a further embodiment of the method according to the invention, the displacement device can displace at least one mirror at an angle to the beam axis of the collimated laser beam and/or transversely to the direction of deflection of the partial beam of the collimated laser beam.

Furthermore, the power ratio between reflected and non-reflected collimated laser beam can be set or adjusted by the displacement device by changing the dimension of the area of the reflecting surface of one of the shifted mirrors in the collimated laser beam.

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description, or may be learned by practice of the invention

BRIEF DESCRIPTION OF THE FIGURES

The invention will be described based on figures. It will be understood that the embodiments and aspects of the invention described in the figures are only examples and do not limit the protective scope of the claims in any way. The invention is defined by the claims and their equivalents. It will be understood that features of one aspect or embodiment of the invention can be combined with a feature of a different aspect or aspects of other embodiments of the invention, in which:

DETAILED DESCRIPTION OF THE INVENTION

The previously formulated problem of the invention is solved by the features of the independent claims. The dependent claims cover further specific embodiments of the invention.

The invention provides a device capable of producing at least one double spot. According to the present invention, the power distribution is selected by pushing at least a first mirror into the laser beam. Thereby the light beam always falls on only one side of the mirror, so that the mirror can be produced easily and economically. The resulting (reflected) partial beams of the laser beam are mirrored via additional mirrors in such a way that they are again reflected next to the non-mirrored (direct) part of the laser beam. The total diameter of the recombined partial beams (mirrored and direct) is kept as small as possible, so that subsequent optical systems can be as small as possible. A raw beam diameter between 20-50 mm is only increased by max. 1 mm in the present invention. The solution is both a cost-effective solution and a long service life of the protective glass.

Figure 1:
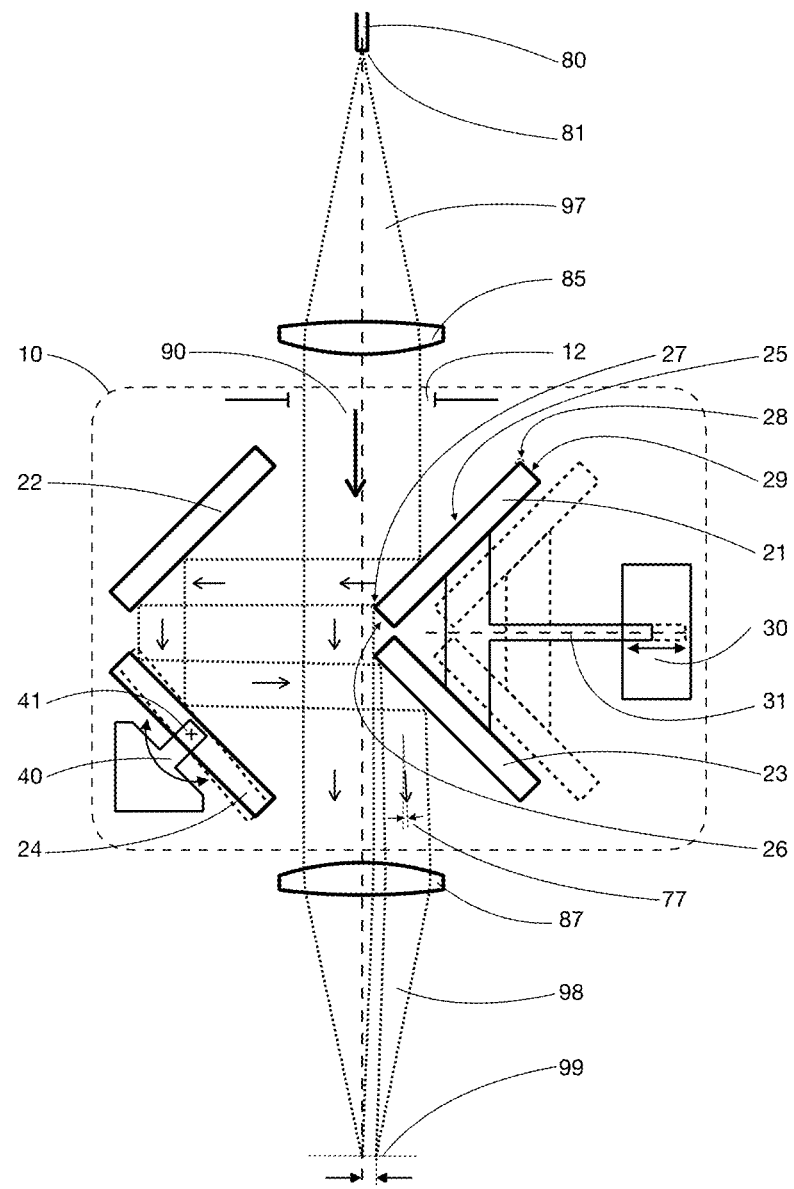
FIG. 1 shows an embodiment with four mirrors, where two mirrors are movable in the direction of the deflection of the axis of the laser beam.

FIG. 1 shows an embodiment in which a first mirror 21 with a mirror surface 25 and a first side surface 26 and first and second edges 27, 28 of the mirror and a third mirror 23 can be moved together in the direction of deflection of the partial beam of the laser beam. Surface 26 can be completely in the shadow of surface 25 and therefore need not be a mirror surface, which is an advantage of the invention. Furthermore, the angle between surface 25 and 26 need not be exactly 90°. In the present invention, edge 27 is ultimately the only mirror edge of the structure that lies in the laser beam, which is also an advantage with respect to the requirements for the manufacture of the mirrors. The mirrors are displaced by means of a displacement device 30 along the displacement axis 31, whereby the displacement causes a change in the power distribution between the two partial beams and accordingly also between the two spots on the workpiece.

A divergent light beam 97 emerges from an optical fiber 80 with a fiber tip 81. This is collimated by the collimating optics 85 and passes through an entrance aperture 12 of the device according to the invention 10. Arrow 90 indicates the beam direction of the now collimated light beam.

The partial beam of the laser beam reflected by the mirror surface 25 first mirror 21 hits the second mirror 22, from which the partial beam of the laser beam is reflected to the fourth mirror 24, which directs the partial beam to the third mirror 23. This in turn deflects the partial beam of the laser beam so that this reflected part of the laser beam now hits the focusing optics 87 next to the direct partial beam of the laser beam, from which a focused light beam 98 with a double beam focus 99 emerges.

At least one of the existing deflecting mirrors must be connected to an angle adjustment device so that the mirror can be rotated to create a multiple spot. In FIG. 1, the fourth mirror 24 is connected to an angle adjuster 40, so that the reflected beam of the laser beam can be tilted by the difference angle 77. By tilting a mirror, a small angle is created between the two partial beams (direct and reflected), so that after focusing through a focusing lens, they hit different positions on the workpiece (double focus).

Figure 2:
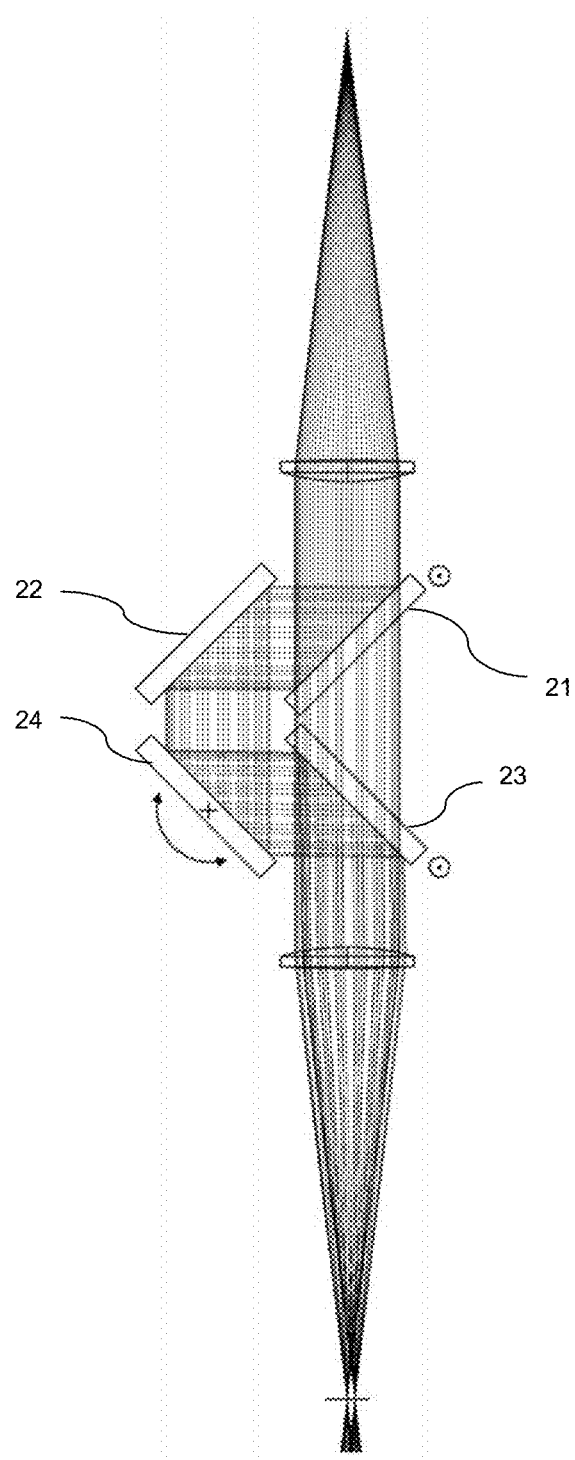
FIG. 2 shows an embodiment with four mirrors, where two mirrors are movable transversely to the direction of deflection of the axis of the laser beam.

An alternative embodiment of the present invention is shown in FIG. 2. This design also comprises four mirrors which are arranged in a collimated laser beam. Of course, it is also possible to adjust the light distribution by moving the mirrors in another direction, see FIG. 1. Alternatively, other mirrors can be moved or tilted, or the four mirrors can be arranged in such a way that an offset in the beam results (indicated by the double arrows).

In FIG. 2, the displacement of two mirrors is performed transversely to the deflection of part of the laser beam, which is indicated by the two points enclosed by a circle, which are the axes on which the mirrors are displaced. Also, in the version in FIG. 2 at least one mirror must be rotated or tilted (double arrow) to create at least one double spot.

Figure 3:
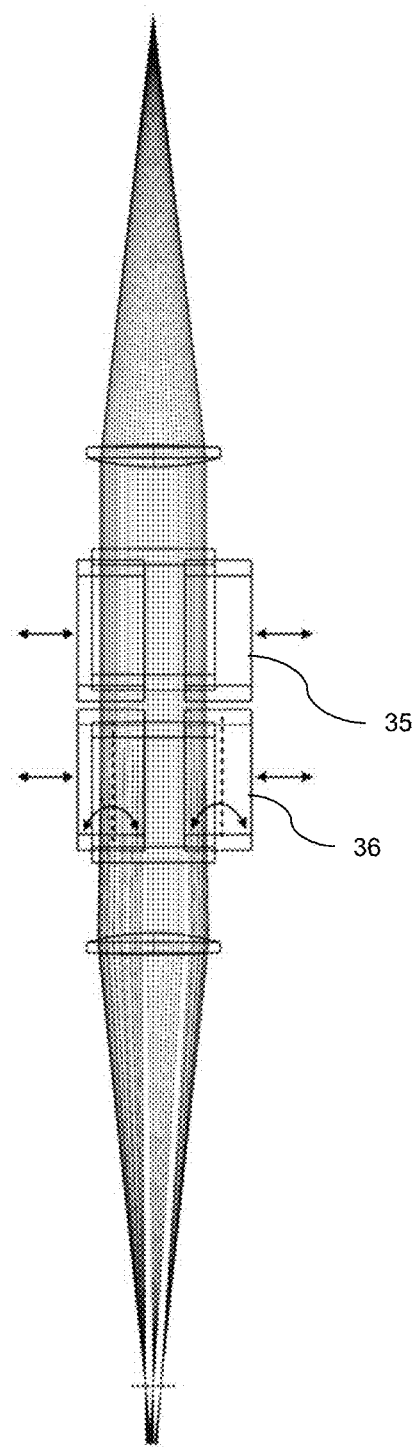
FIG. 3 shows an embodiment with six mirrors, where two mirrors can be moved twice transversely to the direction of deflection of the axis of the laser beam.

A third adjustable spot can be obtained by adding additional mirrors. An example of this is shown in FIG. 3, where an additional pair of mirrors enters the laser beam from the other (opposite) side. By tilting the two parts of mirror 4 (not shown) independently, the distances between the three spots can be adjusted independently.

Figure 4:
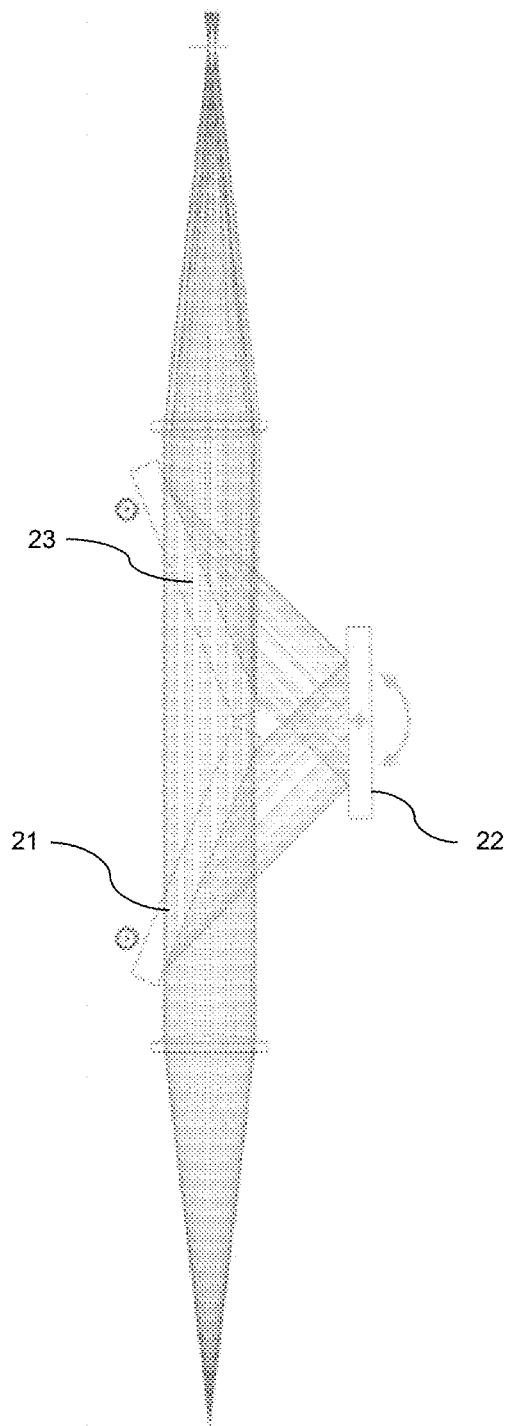
FIG. 4 shows an embodiment with three mirrors, two of which can be moved transversely to the direction of deflection of the axis of the laser beam.

Another possible embodiment of the present invention is shown in FIG. 4. The first mirror 21 deflects a part of the laser radiation away from the optical axis of the laser beam. By moving mirror 21 in FIG. 4 in a vertical axis for display (circle with a dot as axis transverse to the beam direction), the fraction of the deflected laser light can be adjusted. By means of mirrors 22 and 23, this partial beam is again guided next to the non-deflected (direct) part of the laser light, so that both partial beams can be focused on the workpiece through the same lens. The second mirror 22 can be rotated (double arrow), so that two spots are created on the workpiece, depending on the set angle of mirror 22. In this version, mirror 23 is moved together with mirror 21, but this does not necessarily have to be the case.

Figure 5:
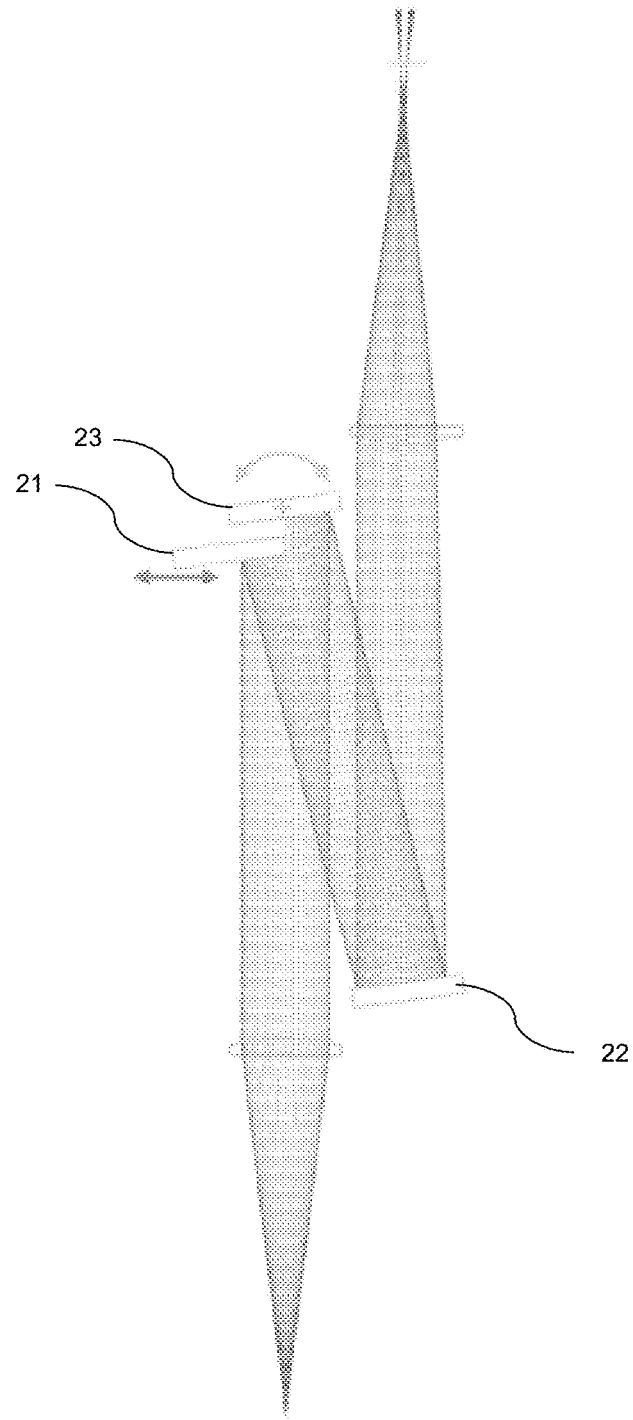
FIG. 5 shows an embodiment with three mirrors, where one mirror is movable in the direction of the deflection of the axis of the laser beam.

Another version is shown in FIG. 5. Here the power distribution is achieved by inserting the laser beam of the first mirror 21 in the direction of the double arrow, i.e. in the direction of the deflection. However, here the laser light, which is not decoupled, is slightly tilted by means of the third mirror 23. Both beams then hit the second mirror 22, which guides the partial beams of the laser beam towards the focusing lens. The design shown in FIG. 5 is cost-effective due to the small number of relatively small mirrors.

Figure 6:
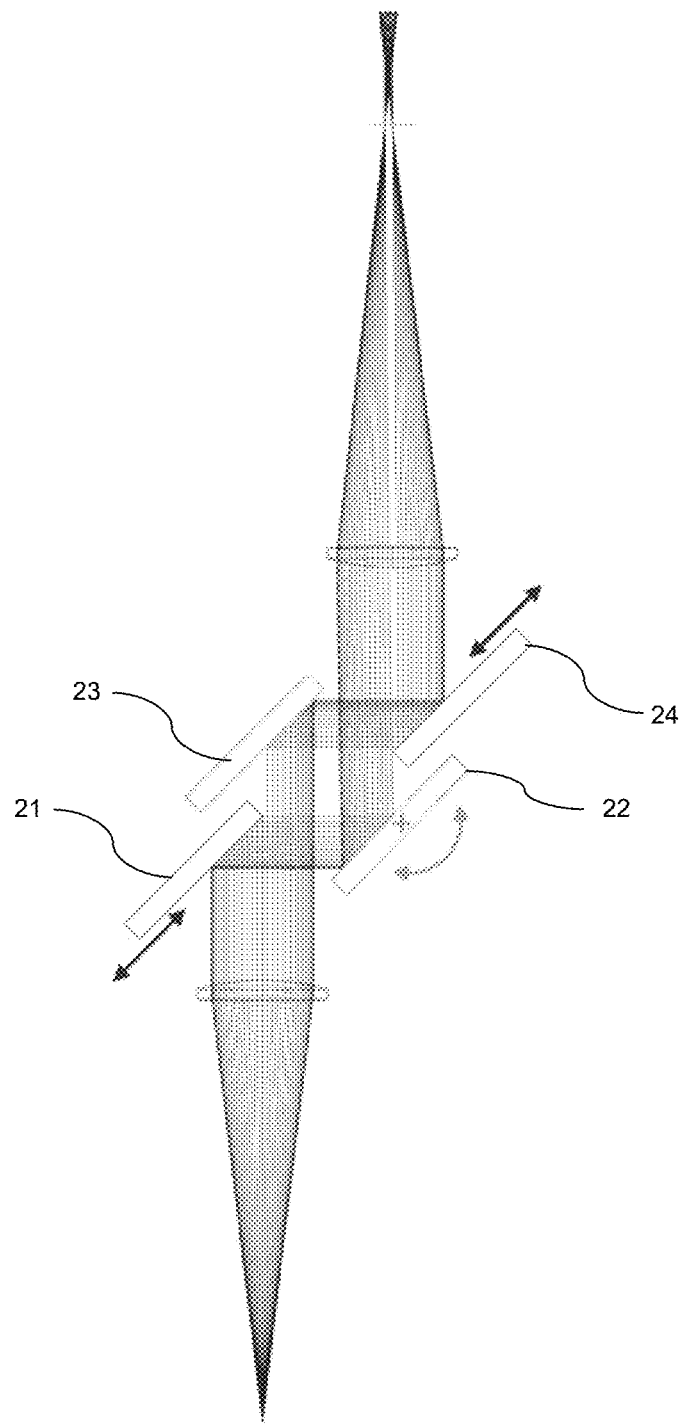
FIG. 6 shows an embodiment with four mirrors, whereby two mirrors can be moved parallel to the direction of deflection of the axis of the laser beam.
Figure 7:
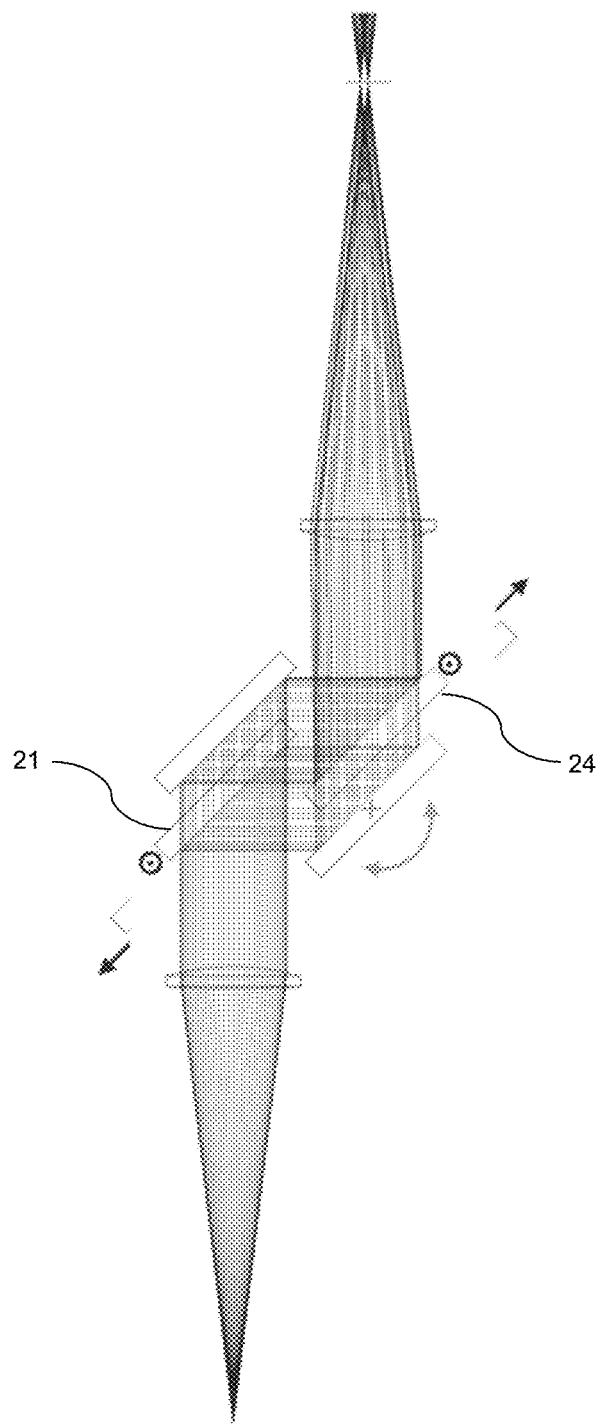
FIG. 7 shows an embodiment with four mirrors, where two mirrors can be moved transversely to the direction of deflection of the axis of the laser beam.
Figure 8:
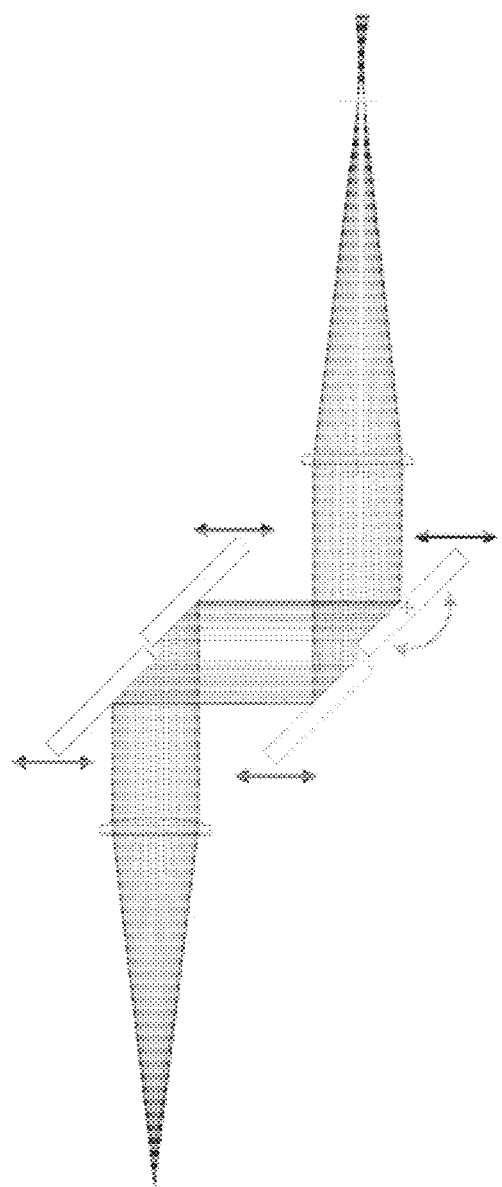
FIG. 8 shows an embodiment with four mirrors, whereby four mirrors can be moved in the direction of the deflection of the axis of the laser beam.

Furthermore, it is possible to move the mirrors not perpendicular to the laser beam, but rather diagonally to it, as shown in FIG. 6 as an example with respect to the first mirror 21 and fourth mirror 24. The second mirror 22 can be tilted or rotated to adjust the distance of the double focus. FIG. 7 shows a variant of the illustration in FIG. 6, where the first and fourth mirror 21, 24 can additionally be moved into the collimated laser beam transversely to the laser beam direction (point with circle as axis). In principle, the displacement or tilting is not limited to individual mirrors, as shown in FIG. 8 as an example and whose direction of movement is indicated by the double arrows.

Figure 9:
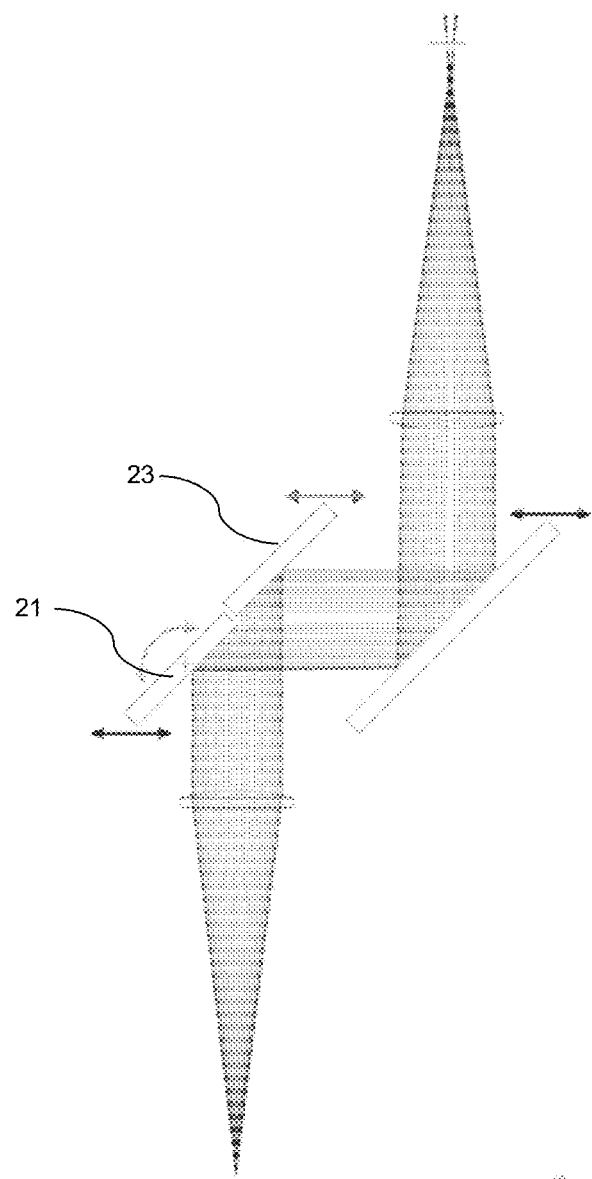
FIG. 9 shows an embodiment with three mirrors, whereby three mirrors can be moved in the direction of the deflection of the axis of the laser beam.
Figure 10:
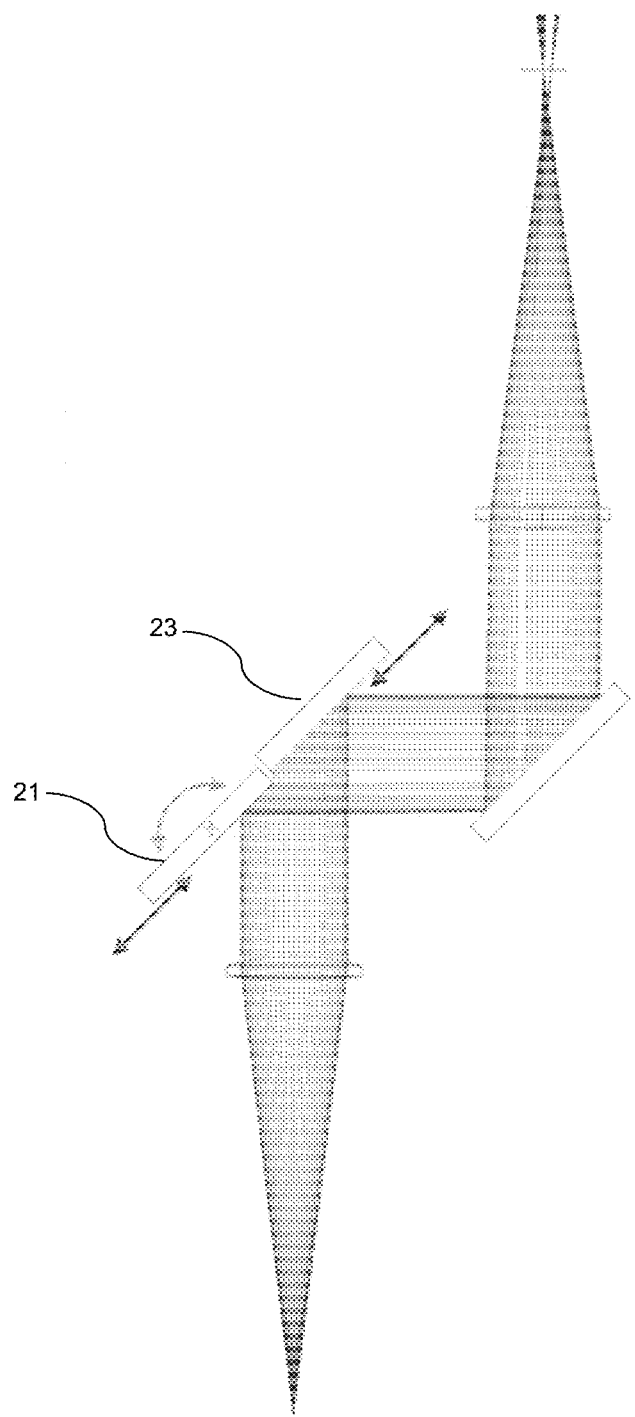
FIG. 10 shows an embodiment with three mirrors, where two mirrors are movable in the direction of the deflection of the axis of the laser beam.

A much shorter version of the present invention is shown in FIG. 9. Here, the first mirror 21 and the third mirror 23 are moved together with the laser beam, either vertically (FIG. 9) or diagonally (FIG. 10). For this purpose, the first mirror 21 is also slightly tilted so that the two partial beams are focused on different positions on the workpiece. The vertical distance between the first mirror 21 and the third mirror 23 is selected in such a way that for each possible tilting of mirror 21 there is no vertical gap between these two mirrors. This means that each laser light beam falls on either mirror 21 or mirror 23.

With e.g. the design shown in FIG. 9, the second mirror can also be omitted, which means that the laser material processing head has a 90° angle and is no longer linear.

The above description of preferred embodiments of the invention has been given for the purposes of illustration and description. It is not intended to be exhaustive or to limit the invention precisely to the disclosed form. Modifications and variations are possible in view of the above teaching or can be obtained from the practice of the invention. The embodiment has been chosen and described to explain the principles of the invention and its practical application in order to enable the person skilled in the art to use the invention in various embodiments suitable for the specific intended use. It is intended that the scope of the invention is defined by the attached claims and their equivalents. The entirety of each of the above documents is incorporated by reference herein.

REFERENCE NUMERALS

10 Beam forming device
11 Entry axis
12 Entry aperture
13 Entry cross section
14 Propagation volume
15 first partial section
16 second section
18 Exit aperture
21 first mirror
22 second mirror
23 third mirror
24 fourth mirror
25 Mirror surface of the first mirror
26 first lateral surface of the first mirror
27 first edge of the first mirror
28 second edge of the first mirror
29 second lateral surface of the first mirror
30 Displacement device
31 Displacement axis
35 fifth mirror
36 sixth mirror
40 Winkelstellvorrichtung
41 Axis of rotation
55 first partial axis
56 Section of the first sub-axis
57 further section of the first sub-axis
66 second sub-axis
67 further section of the second sub-axis
71 first exit axis
72 second outlet axis
77 Difference angle
80 Optical fiber
81 Fiber Tip
85 Collimation optics
87 Focusing optics
90 Light beam
91 first sub-beam
92 second partial beam
97 divergent beam
98 focused beam
99 Beam focus

What is claimed is:

1. A device for variable beam shaping of a light beam, comprising:
   a. an entry aperture with an entry cross-section and with an entry axis which passes centrally through the entry aperture, a continuation of the entry cross-section along the entry axis defining a free propagation volume;
   b. a collimation optics arranged between entrance aperture and an arrangement of mirrors;
   c. the arrangement of mirrors comprising at least
      i. a first mirror, the first mirror having a reflecting surface only on a side facing the laser beam and being arranged at least partially in a collimated laser beam for re-reflection of a partial beam;
      ii. a second mirror with a reflecting surface in the direction of the reflecting surface of the first mirror to deflect the reflected partial beam of the collimated laser beam;
      iii. a third mirror comprising a reflecting surface in the direction of the second mirror to reflect the reflected partial beam of the collimated laser beam back next to the unreflected partial beam of the collimated laser beam;
   d. a displacement device connected to at least one mirror of the array of mirrors to move it into the undivided collimated laser beam;
   e. an angle adjusting device connected to at least one mirror of the array of mirrors for its rotation; and
   f. focusing optics arranged behind the third mirror for focusing the reflected partial beam of the laser beam and the unreflected partial beam of the collimated laser beam with at least one double focus.

2. The device of claim 1, wherein the displacement device is connected to the first mirror.

3. The device of claim 1, wherein the angle adjusting device is connected to the second mirror.

4. The device of claim 1, wherein in the arrangement of mirrors, a further mirror can be placed between the first and second mirror and the mirrors can now be named as follows
   i. a first mirror, the first mirror having a reflecting surface only on a side facing the collimated laser beam;
   ii. a second mirror with a reflecting surface in the direction of the first mirror to deflect the reflected partial beam of the collimated laser beam;
   iii. a fourth mirror comprising a reflecting surface towards the second mirror for redirecting the reflected partial beam of the collimated laser beam;
   iv. a third mirror comprising a reflecting surface in the direction of the fourth mirror to reflect the reflected partial beam of the laser beam from the fourth mirror as well as the unreflected partial beam of the collimated laser beam;

wherein the reflecting surfaces of the first and second mirrors are arranged parallel to each other, the second or fourth mirror is connected to the angle adjusting device for its rotation, and the first and third mirrors are connected to the displacement device and are movable therewith in the direction of reflection of the partial beam of the collimated laser beam.

5. The device of claim 4, wherein first and a third mirror are connected to the displacement device so that they are movable transversely to the direction of deflection of the collimated partial beam of the laser beam.

6. The device of claim 1, wherein the arrangement comprises two further mirrors with which a second partial beam of the collimated laser beam is reflected, the two further mirrors being named as follows,
   a. a fifth mirror arranged adjacent to the first mirror for reflecting a second partial beam of the collimated laser beam onto the second mirror, and
   b. a sixth mirror arranged adjacent to the third mirror for reflecting the second reflected partial beam of the collimated laser beam again adjacent to the unreflected partial beam of the collimated laser beam, the fifth and sixth mirrors being movable transversely to the deflection direction of the collimated partial beam of the laser beam by means of a connection with a second shifting device.

7. The device of claim 6, wherein second or fourth mirror are divided and the at least two parts may be independently adjustable.

8. The device of claim 1, wherein first and third mirrors can be arranged one behind the other, partially overlapping, in such a way that they each partially reflect the collimated laser beam onto the second mirror, the first mirror can be moved into or out of the collimated laser beam at an angle to the beam direction of the collimated laser beam by means of the displacement device, and the third mirror is connected to the angle adjustment device in order to be able to rotate it.

9. The device of claim 1, wherein the arrangement of mirrors comprises four mirrors, wherein the first mirror is arranged to reflect a partial beam of the collimated laser beam to the second mirror, the third mirror is arranged partially overlapping behind the first mirror to redirect a partial beam of the collimated laser beam to the fourth mirror, and the second and fourth mirrors are arranged partially overlapping one behind the other, in that they each deflect the reflected partial beam of the collimated laser beam onto the focusing optics, the first and fourth mirrors being connected to a displacement device in order to move the latter into or out of the collimated laser beam at an angle to the beam direction of the collimated laser beam, and the second or third mirror being connected to an angle adjustment device in order to be able to rotate the latter.

10. The device of claim 9, wherein first and fourth mirrors can be arranged displaceable at right angles to the direction of deflection of the partial beam of the laser beam.

11. A method for generating a multiple spot in laser material processing, comprising the steps
   a. Collimation of a divergent laser beam by means of collimation optics;
   b. Displacement of at least a first mirror in a part of the collimated laser beam by a displacement device;
   c. Reflecting a partial beam of the collimated laser beam through the first mirror by means of a reflecting surface onto the reflecting surface of a second mirror;
   d. Reflecting the partial beam of the collimated laser beam through the second mirror by means of a reflecting surface onto the reflecting surface of a third mirror;
   e. Reflection of the partial beam of the collimated laser beam by the third mirror next to the unreflected partial beam of the collimated laser beam;
   f. Creating a difference angle between the reflected and the unreflected partial beam by rotating at least one of the mirrors;
   g. Focusing of reflected and unreflected partial beam of the collimated laser beam by means of focusing optics;
   h. Imaging a beam focus with at least a double focus on a workpiece to be processed.

12. The method of claim 11, comprising the step of using four mirrors to create a double focus.

13. The method of claim 11, comprising the step of using a fifth and sixth mirror to generate an additional focus.

14. The method of claim 11, wherein the displacement device is configured to displace at least one mirror at an angle to the beam axis of the collimated laser beam and/or transversely to the direction of deflection of the partial beam of the collimated laser beam.

15. The method of claim 11, wherein the power ratio between reflected and non-reflected collimated laser beam can be set or adjusted by the displacement device by changing the dimension of the area of the reflecting surface of one of the shifted mirrors in the collimated laser beam.

* * * * *